UNITED STATES PATENT OFFICE 2,381,705

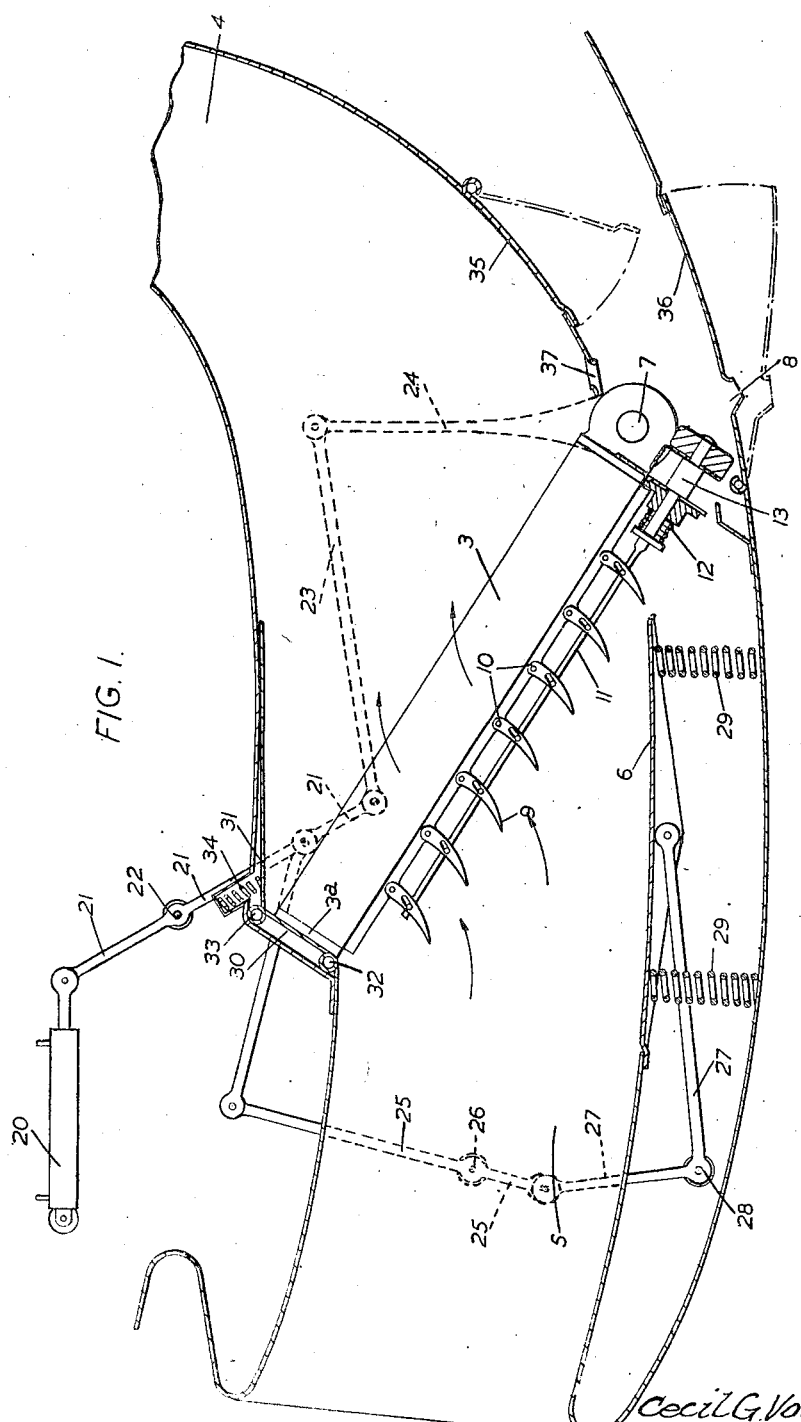

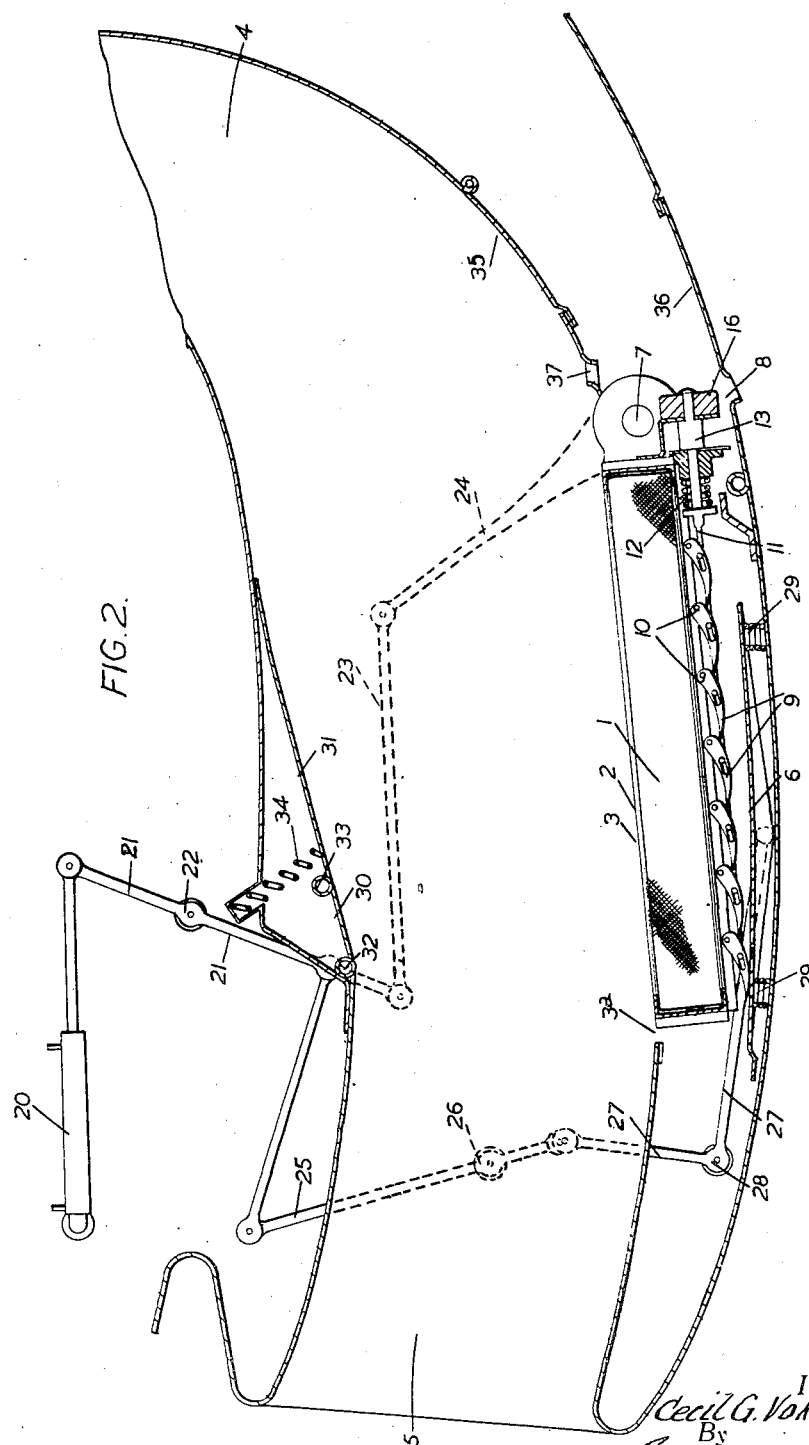

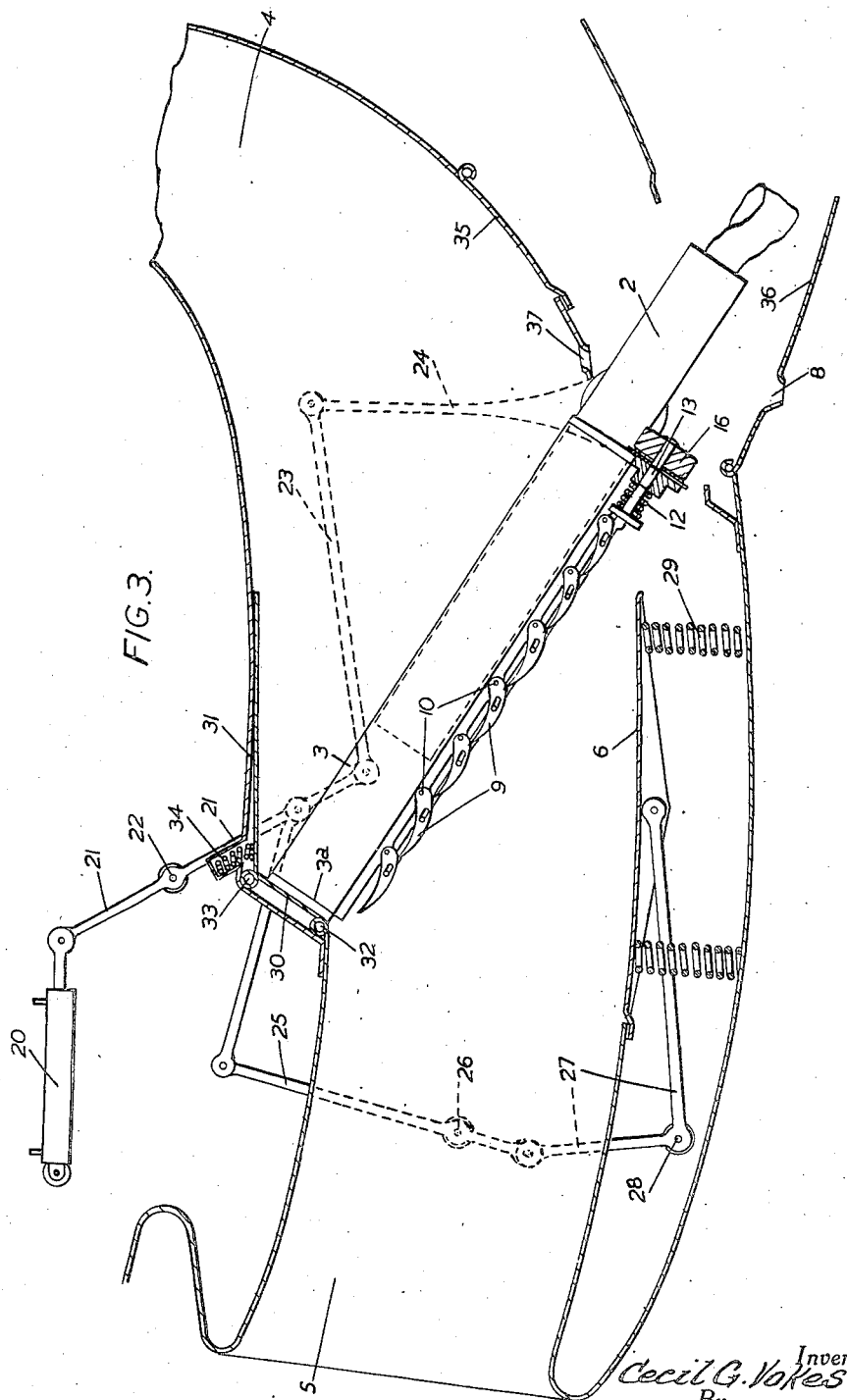

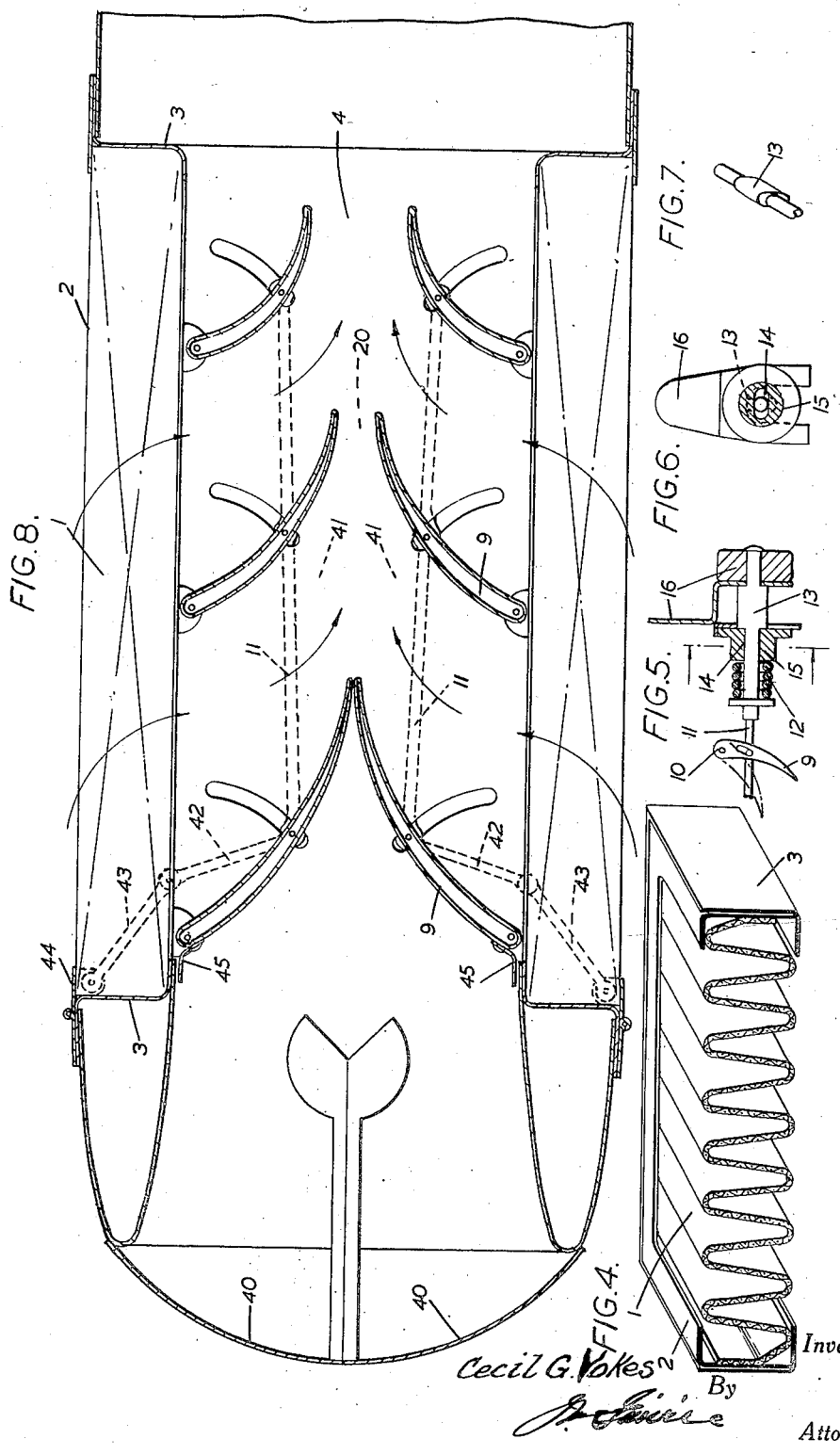

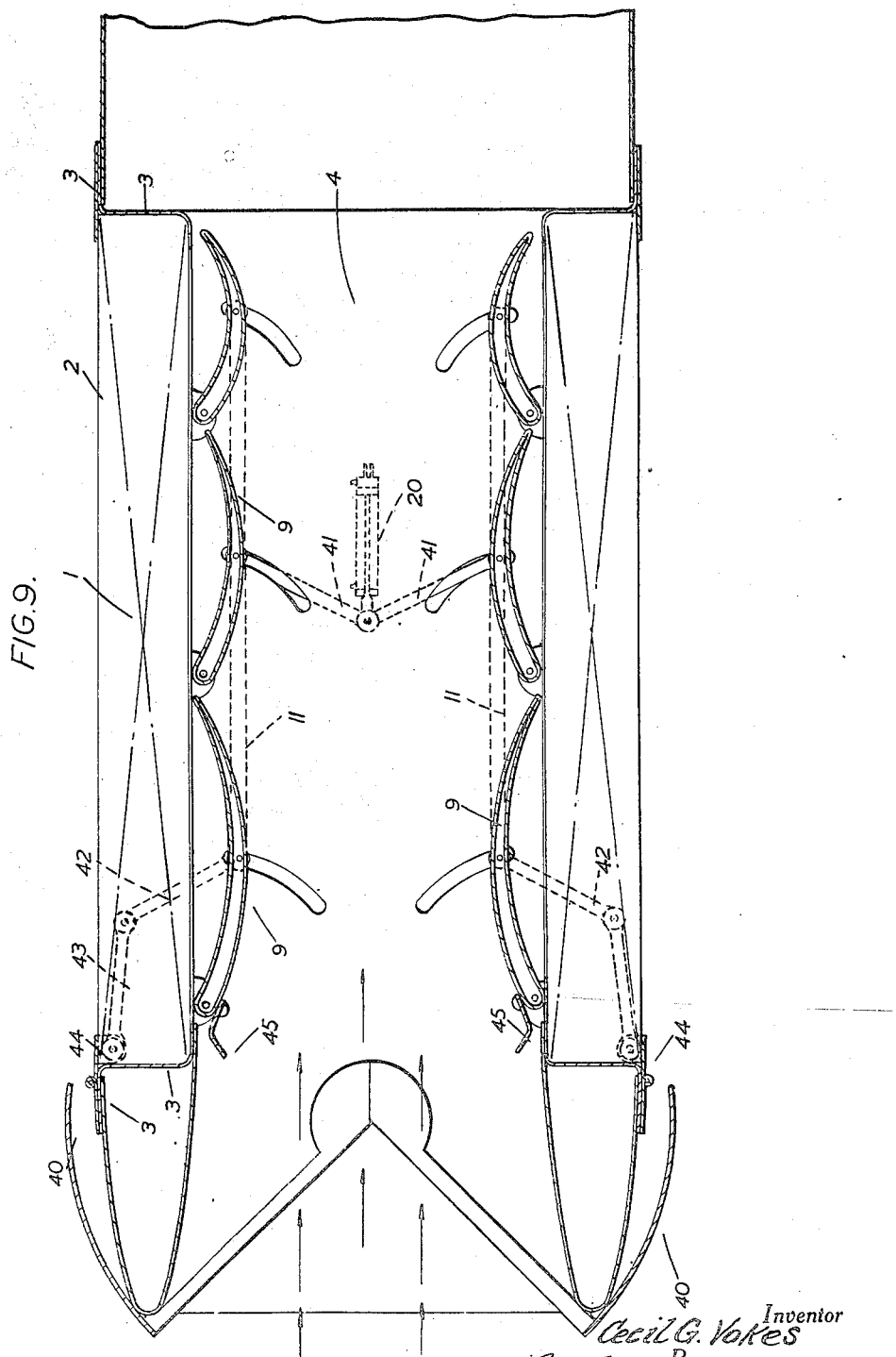

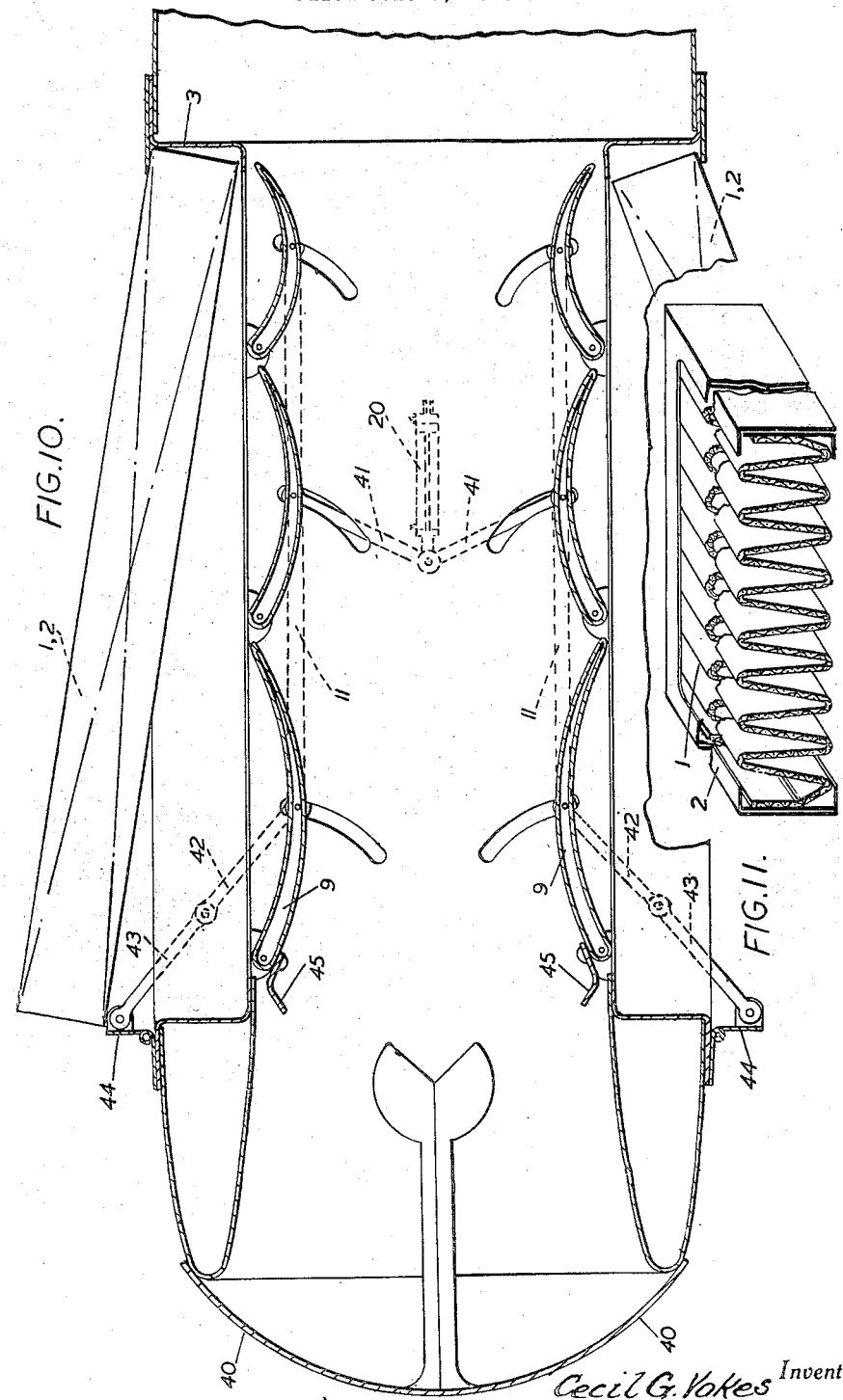

FILTER

Cecil Gordon Vokes, London, England

Application June 8, 1943, Serial No. 490,068
In Great Britain June 11, 1942

3 Claims. (Cl. 183—33)

This invention is primarily designed for filtering air passing to the engines of aircraft, but it is not necessarily confined thereto, parts of the invention being of wide application where conditions are appropriate to their use.

It is often desirable to cut out a filter temporarily. For example, it may be desired to filter the air passing to an aircraft engine when taking off or landing or at low altitudes but to leave the intake free while actually flying or when flying at higher altitudes. Another problem is the prevention of dirt ingress when the elements are being cleaned or replaced while servicing a machine.

Typical forms of the invention are illustrated by the accompanying drawings, the parts of the invention for which a monopoly is desired being those set out in the claims.

In the drawings:

Figure 1 shows in sectional diagrammatic form filtering means for air entering a duct leading to the engine air intake of an aircraft; the parts being shown in position to filter the entering air;

Figure 2 shows the same with open intake;

Figure 3 shows the same with entry to the duct substantially shut off, so that the filtering element which includes the filtering screen can be removed for cleaning or replacement without danger of dust blowing into the clean side;

Figure 4 is a cross-sectional view in perspective of the filtering element;

Figures 5, 6 and 7 are details;

Figures 8, 9 and 10 represent another typical form of the invention, being views corresponding to Figures 1, 2 and 3; and Figure 11 is a view of the element, corresponding to Fig. 4.

As shown in Figs. 1 to 7, the filter unit lies in a scoop or other entry duct arranged to admit air from outside the surface skin of an engine cowling or wing or other suitable part of an aircraft. The filter unit may include a filtering element, for example a pleated filtering screen 1 in a light mounting 2 mounted in a frame 3 which normally extends at an incline across the passage outside the engine intake duct 4. The entry scoop 5 (where, as shown, such is used) for an updraught type of engine inlet may, for example, have a base portion covered by a false bottom 6 which extends back to the trailing edge of the frame of the unit. The frame 3 is pivotally mounted at 7 near this edge and when in use lies at an upward and forward incline as shown at Fig. 1. When the filter is cut out, the unit is moved down to occupy the top of the base portion, the false bottom moving down beneath it as shown at Fig. 2. The base portion has an exit 8 into the outer air, arranged when the parts are in the position of Fig. 2 to help induce air flow through the element from the clean side (which now faces the interior of the entry duct) so as to remove adherent dust and grit from the dirty side and discharge it.

Air stream directing vanes 9 are shown in front of the filter element in Fig. 1. These are pivoted to the frame 3 and small conventional torsion springs (not shown) in the pivots 10 hold them open unless they are forced to close. As shown in Fig. 2 they have been forced to close by contact with the false bottom 6 and the movement towards the frame of the connecting link 11 and the parts associated with it. As shown in Fig. 3 they have been forced to close by release of the relatively powerful compression spring 12 which necessarily takes place when a mechanic desires to remove the element 1, 2 from its frame 3. This is illustrated at Figs. 5 to 7, from which it will be seen that the spring 12 is normally held in compression by the bar 13 crossing the slot 14 in the abutment 15. At the same time, the retaining nose and its knob 16, fixed relatively to the bar 13, lies behind the element 1, 2 so that the element cannot be withdrawn. Upon rotating the retaining nose through 90° the compression spring is released, the vanes 9 are closed and the element 1, 2 can be withdrawn from the frame 3, the mounting 2 being worked past the nose and knob 16 by momentarily slightly compressing the spring 12.

The general operation will be understandable to those familiar with the art from the drawings and will be described only briefly. A hydraulic jack is indicated at 20, and this may be under the pilot's independent control or may alternatively or additionally be linked with the control of some part which will normally require the position of Fig. 1 at ground level and low altitude—for example a retractable undercarriage. A lever 21 is pivoted at a fixed point 22. By links 23 and levers 24 on each side of the ducting it moves the frame 3; and similarly by levers 25 pivoted at 26 and bell crank 27 pivoted at 28 it moves the false bottom 6 against springs 29. When the frame 3 is in the position of Figs. 1 and 3 a double flap 30, 31 with conventional torsion springs and stops at the respective pivots 32, 33, tending to bring it to the position of Fig. 3, is bent against the spring 34 by the pad 3a at the end of the frame 3, leaving, in the position of Fig. 1, a full opening for the main air flow through the filter screen 1, since the flaps 9 are open. There is, however, a small by-pass along the pleats behind the flaps and between the bottom flap and the false bottom 6 by which dirt, rain or snow can escape through the opening 8 and into the outer atmosphere. The flaps 35 and 36 are normally held shut by engine suction and conventional torsion springs at their pivots, but can open as indicated in dotted lines in case of back fire. A small petrol drain hole can be provided at 37. The open intake position of Fig. 2 occurs when the lever 21 is thrown over by the jack 20; it will be noted that the suction effect at the opening 8 will withdraw a small proportion of the air entering the scoop, some of which will pass through the filter screen 1 in the reverse direction. A cleaning effect is thus produced in open intake position. In case it is desired to remove the element 1, 2 for servicing the mechanic opens the flap 36 while withdrawing it as shown at Fig. 3 and as already described and the fact that the vanes 9 are closed will protect the engine intake side of the frame 3 from wind-blown dust.

Turning now to the form of Figs. 8 to 11, a substantially rectangular intake 4 is shown in sectional plan view in Figs. 8 to 10 and Fig. 11 shows the element comprising the pleated filter screen 1 in its light mounting 2. Two elements are shown, in frames 3 secured one each side of the duct and front flaps 40 are controllable by hydraulic jack and linkage in conventional manner to prevent or allow entry at (as shown) the front end of the duct. Vanes 9 with connecting rods 11 are controlled by the jack indicated at 20 by toggle links 41. The control of flaps 40 and vanes 9 can be normally simultaneous or linked if desired, but such arrangements are within the competence of any engineer and are not illustrated. As shown in Fig. 8 air is entering through the filters as indicated by the arrows. The vanes are open and serve to direct it towards the engine intake and to avoid turbulence. It will be noted that each set of the vanes 9 is connected by links 42, 43 to a pivoted flap 44 which is normally retained in the position of Figs. 8 and 9 by conventional fasteners (not shown) at its ends. This flap retains the element 1, 2 in its frame 3. If large particles of dirt or the like strike the filtering screen 1 and do not adhere, they will be quickly removed into the surrounding atmosphere when the aircraft is flying or in a moving air stream. It will be noted from Fig. 9 that for open intake the vanes 9 are closed and the front flaps opened, but deflectors 45 on the front vane insure a sufficient by-pass through the elements in the reverse direction to effect substantial cleaning. The links 42 and 43 are flexed and the flaps 44 still securely retain the elements 1, 2. Fig. 10 shows the position of the parts for servicing. The front flaps 40 are closed as usual at ground level, but the fasteners are removed from the retaining flaps 44. Before they can be opened to remove the elements, however, the vanes 9 must be shut by a servicing control of the jack 20, as will be apparent from the figure.

It will be apparent that numerous seals and locking devices of similar function can be devised within the terms of the claims once the underlying ideas are understood—for example a rotary slide in the case of a cylindrical scoop or duct.

I claim:

1. Filtering means for fluid passing into a duct including a removable filtering screen and means substantially to seal off the area normally occupied by the filtering screen normally inactive means to move the sealing means to sealing position, and screen-holding means movable to prevent or permit removal of the filtering screen, said screen holding means operating when in position to permit withdrawal of the screen to release the normally inactive means for automatic operation of the sealing means to sealing position, whereby the sealing means is in sealing position before the screen can be withdrawn.

2. Filtering means for fluid passing into a duct including a removable filtering screen, a frame carrying the filtering screen, flaps pivoted to the frame and movable to seal off the area of the filtering screen or to serve as guides for fluid passing therethrough at will, means normally holding the screen against removal and operable to permit removal of the screen, and means for moving the flaps to a position to seal off the screen area, said flap moving means being controlled for operation in the movement of the screen holding means to a position to release the screen for removal.

3. A duct provided with a pleated filtering screen, flaps pivoted adjacently to the screen, means to move the screen to a first position to cause fluid passing into the duct to pass through the screen, or to a second position to enable fluid to pass mainly directly into the duct, the screen in the second position being open to some flow of fluid in the reverse direction through the filtering screen and means to cause the flaps to close towards the screen substantially to cover the area thereof when the fluid is passing directly into the duct, the pleats affording channels for the passage and distribution of seepage over the surface of the screen between the said surface and the closed flaps.

CECIL GORDON VOKES.